United States Patent [19]

Swisher

[11] 4,152,910

[45] May 8, 1979

[54] METER BOX GUARD LOCK

[75] Inventor: James A. Swisher, Shelton, Conn.

[73] Assignee: C. Cowles & Company, New Haven, Conn.

[21] Appl. No.: 840,147

[22] Filed: Oct. 7, 1977

[51] Int. Cl.² .................. B65D 55/14; E05B 65/52
[52] U.S. Cl. ........................................ 70/159; 70/232; 70/DIG. 34; 292/256; 292/DIG. 11
[58] Field of Search ................ 70/158, 159, 19, 63, 70/164, 232, DIG. 34, 416–418; 292/256, 258, DIG. 11

[56] References Cited

U.S. PATENT DOCUMENTS

| 321,628 | 7/1885 | Nelson | 292/256 |
|---|---|---|---|
| 1,019,343 | 3/1912 | Moore et al. | 292/256 X |
| 1,126,064 | 1/1915 | Mulholland | 292/256 X |
| 3,867,822 | 2/1975 | Morse et al. | 70/232 X |
| 3,976,345 | 8/1976 | Walters | 232/43.2 X |
| 4,008,585 | 2/1977 | Lundberg | 70/232 X |
| 4,031,722 | 6/1977 | Michelman et al. | 292/258 X |

Primary Examiner—Roy D. Frazier
Assistant Examiner—William E. Lyddane
Attorney, Agent, or Firm—DeLio and Montgomery

[57] ABSTRACT

A highly tamper-resistant lock for attachment to an electric meter box, as a supplement to other locking means, if any, or a replacement therefor, the lock having one part secured to the box and a separable part adapted to be locked in engagement with the first part and in a position to prevent separation of the parts to project in front of the meter box cover to prevent opening thereof. The part secured to the box includes a reinforcement member having at least one wing piece which engages a portion of the separable part in the locked position to prevent tilting of the separable part by prying. The lock for the separable part is shown as a plunger type lock, to be inserted in a deep tubular chamber.

5 Claims, 21 Drawing Figures

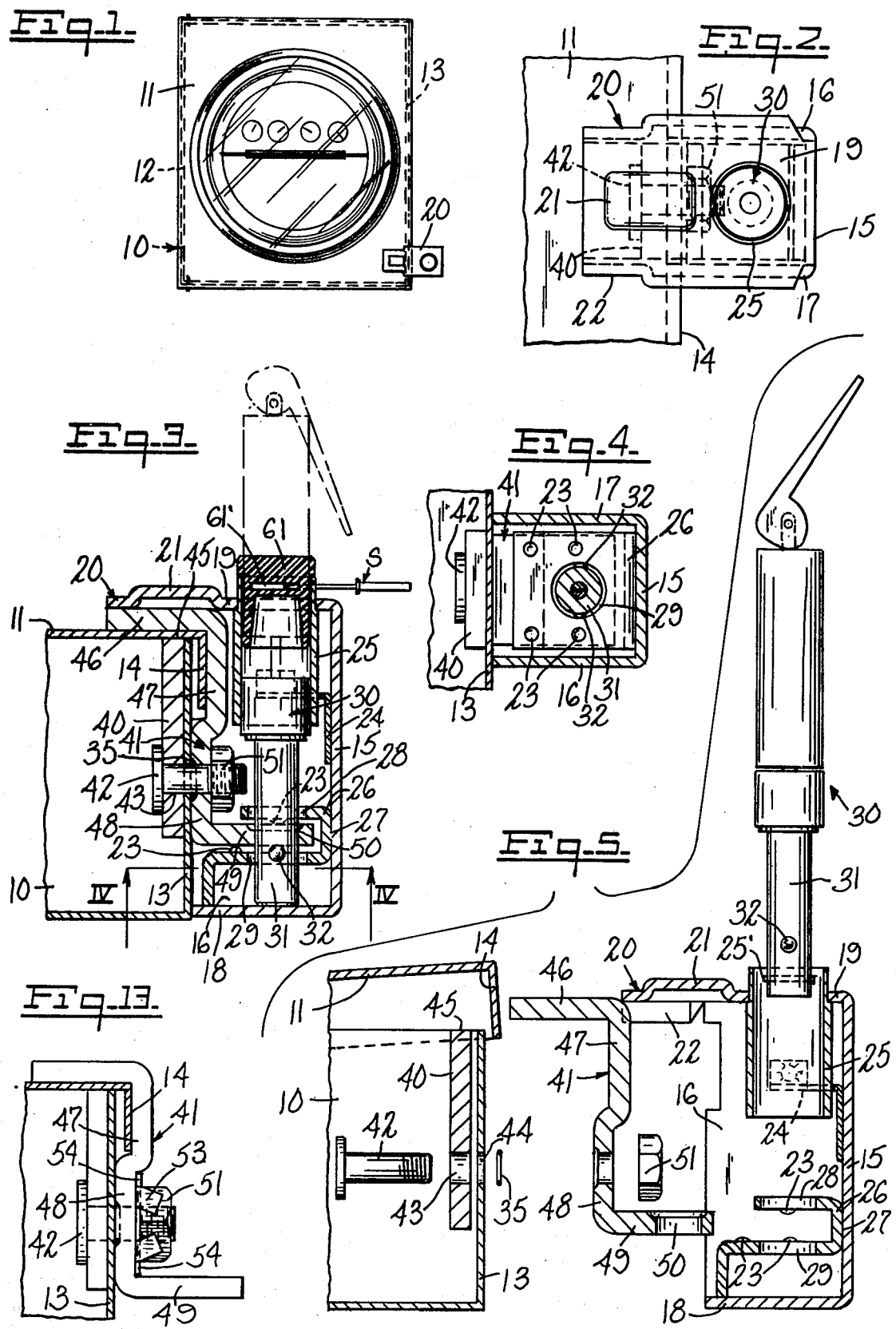

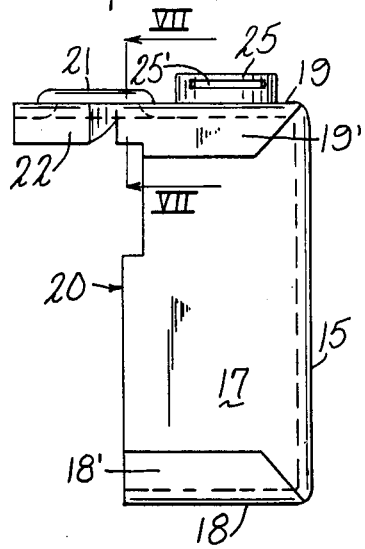
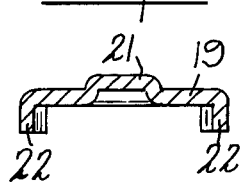
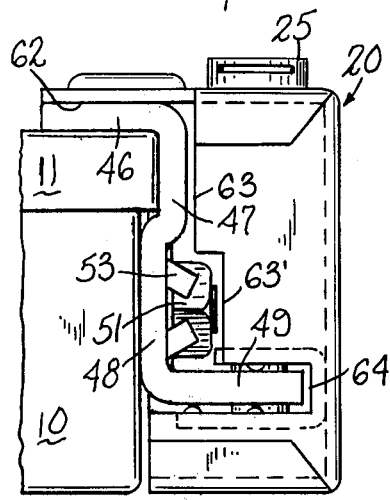
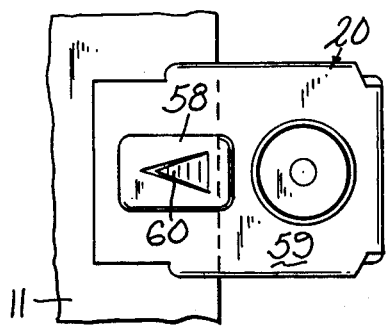
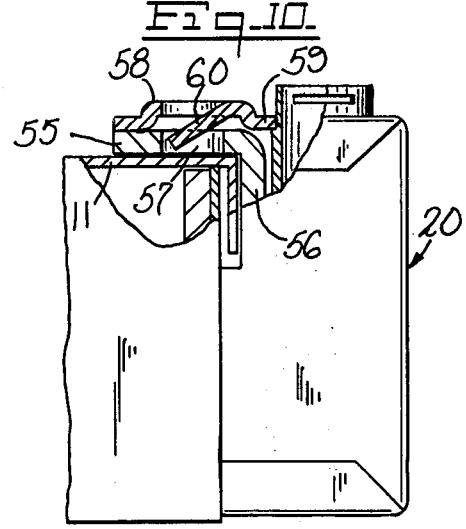
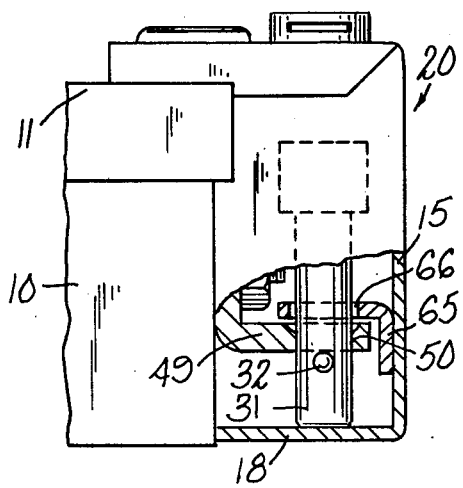
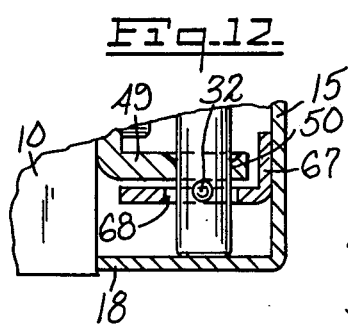
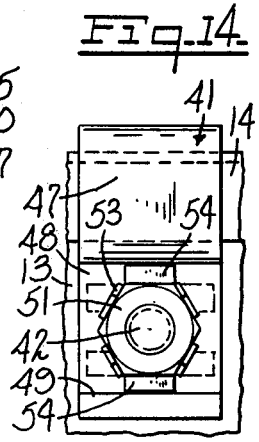

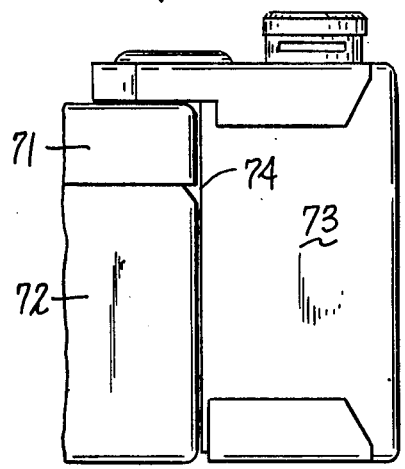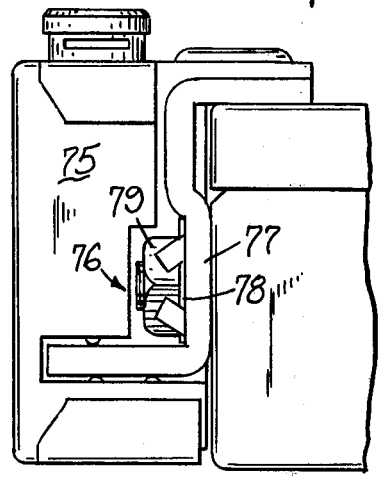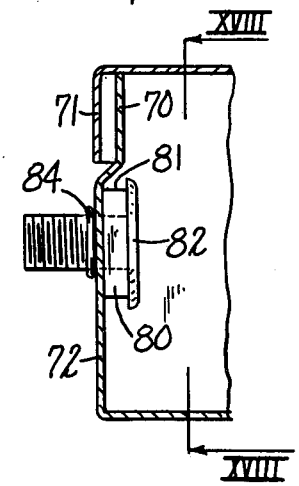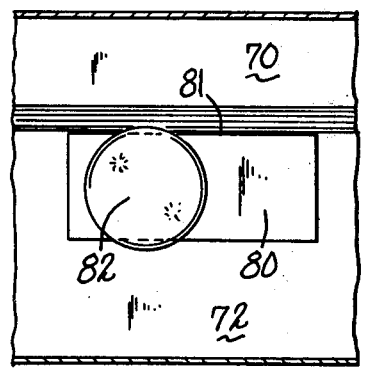

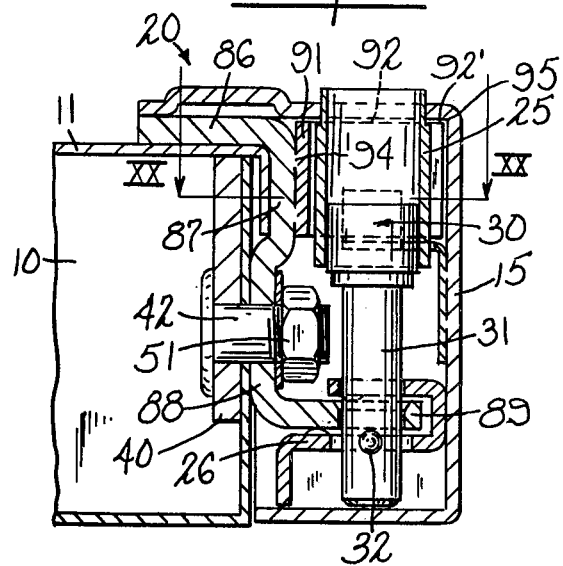
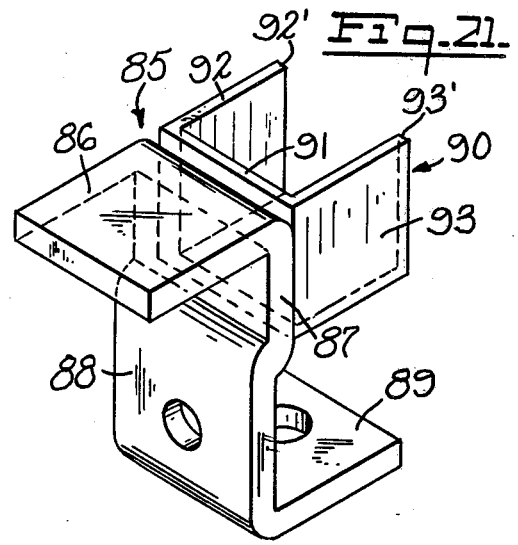
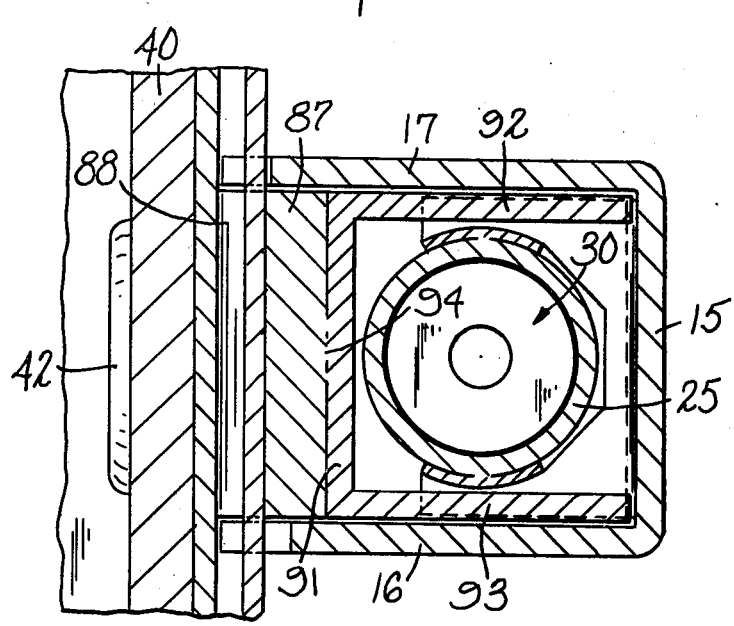

METER BOX GUARD LOCK

This invention relates to a tamper-resistant lock for attachment to an electric meter box (or socket box) in such a position that the cover of the box cannot be opened without destructive vandalizing of the installation.

The theft of electric current by means of "rigged" meters, arranged to show only a part of the current actually drawn from the service line, or none at all, is a very serious problem causing great concern among utility companies. Specific companies in Chicago, Philadelphia, New York City and Long Island have reported losses in the millions of dollars per year from the activities of individuals or groups of meter riggers. Conventional locks, such as padlocks, may be deterrents, but their removal and replacement is not noticeable and does not alert an inspector to the fact of tampering.

It is accordingly an object of the present invention to provide a lock in the form of a very strong housing, part of which projects closely across a corner of the meter box cover, the housing being locked internally to a separable element which is permanently attached to the adjacent side of the box.

It is a further object of the invention to provide a meter box lock which can be installed on a meter box with minimal exposure to the live socket area.

It is another object of the invention to provide a meter box lock which accommodates a plunger lock operable only by a complex key which cannot readily be duplicated.

It is a still further object of the invention to provide certain improvements in the form, construction and arrangement of the several parts whereby the above-named and other objects may be effectively obtained.

The invention accordingly comprises an article of manufacture possessing the features, properties, and the relation of elements which will be exemplified in the article hereinafter described, and the scope of the invention will be indicated in the claims.

A practical embodiment of the invention is shown in the accompanying drawings wherein:

FIG. 1 represents a front elevation of a meter box with the lock mounted thereon;

FIG. 2 represents a front elevation of the lock, full size;

FIG. 3 represents a horizontal medial section through the lock and adjacent portions of the meter box;

FIG. 4 represents a vertical section on the line IV—IV of FIG. 3;

FIG. 5 represents a horizontal section as in FIG. 3 with the parts in exploded position to illustrate the assembly thereof;

FIG. 6 represents a top plan view of the lock;

FIG. 7 represents a detail vertical section on the line VII—VII of FIG. 6;

FIG. 8 represents a bottom plan view of a modified form of lock housing;

FIG. 9 represents an elevation of one end of a lock housing, showing another modification thereof;

FIG. 10 represents a bottom plan view, partly in section, of the lock shown in FIG. 9 mounted on a meter box, parts being broken away;

FIG. 11 represents a detail bottom plan view, partly in section, of a lock having a slightly modified interior structure;

FIG. 12 represents a detail view as in FIG. 11 showing an alternative structure;

FIG. 13 represents a detail sectional view of the bolt and nut assembly, with associated parts, to show a special form of lock washer on the nut;

FIG. 14 represents a detail elevation of the same parts.

FIGS. 15 and 16 represent top and bottom plan views of a modified form of lock housing;

FIGS. 17 and 18 represent a detail section and elevation showing the threaded stud mounting in the assembly of FIGS. 15 and 16.

FIG. 19 represents a horizontal medial section, similar to FIG. 3, through a modified form of lock and adjacent portions of the meter box;

FIG. 20 represents a vertical section on the line XX—XX of FIG. 19, and

FIG. 21 represents an isometric view of the modified angle piece used in the modified form of FIGS. 19 and 20.

Referring to the drawings, a conventional meter box (sometimes referred to as socket box) comprises a main box portion 10 and a cover 11, the cover being hinged or otherwise attached to the box portion at one side 12 and provided with a simple locking and sealing means (not shown) at the other side 13. In one type of box the cover has a flange 14 which overlaps for a short distance the adjacent edge of the box portion, as shown in FIGS. 3 and 5.

The lock of the present invention has a one-piece housing formed from heavy sheet metal to provide an outer wall 15, upper and lower walls 16, 17 integral with the outer wall and lying at right angles thereto, a rear wall 18 and a front wall 19, both also integral with the outer wall and bent to lie at right angles thereto. The top and bottom edges of the rear and front walls are extended, bent over the adjacent edges of the upper and lower walls and welded thereto, as shown at 18' and 19' in the FIGS. 6 and 7. The front wall 19 projects beyond the plane of the free edges of the walls 16, 17, 18 to provide a lock guard 20, reinforced by the ridge 21 and provided with flanges 22.

A plunger-type lock tube 25 is mounted in the front wall 19, extending into the lock body with its axis parallel to the outer wall 15, the tube being welded to a bracket 24 which is welded to the wall 15. A yoke 26 is welded on the outer wall at 27, the parallel arms of the yoke having openings 28, 29, aligned with the lock tube 25 to guide, somewhat freely, the shank of the separable lock 30, and one arm being extended at a right angle to rest against the wall 18 of the housing where it may be welded. The lock 30 may be of the type disclosed in Moberg U.S. Pat. Nos. 3,002,368 and 3,033,016 and will be described herein only to explain that the shank 31 is provided with steel balls 32 (FIGS. 4 and 5) which can be retracted into the shank or, in locking position, forced radially outward by an internal plunger to engage an adjacent element and prevent axial movement of the shank. Movement of the plunger and shank is effected by an elongated key in a manner fully described in the Moberg patents.

The housing described above is designed to enclose meter box securing elements which include the inner plate 40 and the outer angle piece 41, the plate 40 being installed inside the box where it is held by the threaded stud 42 passing through a hole 43 in the plate and a matching hole 44 in a side wall of the meter box. The plate is rectangular and its edge 45 lies flush with the edge of the box where it is stabilized by the cover 11 in closed position, as shown in FIG. 3. The head of the threaded stud is preferably welded to the plate for convenience in assembly. The angle piece 41 is Z-shaped in profile, having an outer portion 46 adapted to rest against the front of the cover, an outer middle portion 47, forming a right angle with the outer portion and adapted to rest against the flange 14, an inner middle portion 48 offset from the portion 47 in a position to rest against the side wall of the box, and a locking portion 49 forming a right angle with the portion 48 and projecting outwardly from the side of the box. The portion 48 is bored to receive the threaded stud 42, and the portion 49 is bored at 50 to receive the shank 31 of the plunger lock when the parts are assembled as shown in FIG. 3. The housing elements are so proportioned that the yoke 26 embraces the portion 49 when the front wall 19 is in a position to overlie the outer portion 46 of the angle piece, the upper and lower walls 16, 17 are spaced to receive freely the portions 47, 48 and 49 of the angle piece, and the flanges 22 lie adjacent the edges of the portion 46. The inner plate 40 and angle piece 41 are held together on the side wall of the box by the stud 42 and the nut 51, screwed thereon.

To install the lock just described on a meter box, the only modification of the box is the formation of the hole 44, which may be drilled or, preferably, punched by means of an insulated punch, and the only manipulation within the box (a potential danger area) is the passing of the stud 42 (welded to the plate 40) through the hole 44 in the wall of the box. For convenience in assembly, an O-ring 35 may be fitted on the stud 42 to hold it in place while the angle piece 41 and nut 51 are affixed. With the bolt in place, the cover is closed, the angle piece 41 is put in position with the bolt passing through the hole in portion 48 and the nut 51 is screwed tight.

At that point the meter box is held closed very securely, in a mechanical sense, but it could readily be opened by merely unscrewing the nut and releasing the angle piece. The lock housing serves to make the nut inaccessible, and to this end the housing, with the plunger lock removed, is fitted over the angle piece so that it is completely enclosed, except for the end of the portion 46, with the portion 49 extending between the arms of the yoke 26 and the bore 50 aligned with the openings 28, 29. The facing surfaces of the yoke arms may be provided with bosses 23 to minimize the free play of the portion 49 in the yoke without requiring too much precision in the assembly of the elements.

Unscrewing of the nut 51 may be specifically inhibited by the addition of a six-leaved lock washer 53, as shown in FIGS. 13 and 14, the washer being constructed so that four of the leaves can be bent out to bear against four sides of the nut, while two oppositely disposed leaves 54 lie flat against the angle piece 41 with their ends abutting the adjacent surfaces of the portion 49 and the offset between portions 47 and 48.

The housing is locked in place by inserting a plunger lock 30 in the tube 25, advancing its shank 31 through the matching openings in the yoke and the angle piece to the position shown in FIG. 3, and actuating the lock plunger to force outward the balls 32, thus locking together the entire assembly. The shank has a close fit in the bore 50 of the angle piece and the projecting balls prevent the shank from being withdrawn since they are just below the lower side of the portion 49 (as shown in FIG. 3) and engage the edge of the bore 50.

The tube 25 has a length which permits the lock head to be well within the housing in such an inaccessible position that tampering and efforts at picking are discouraged. This arrangement also provides room to insert a plastic plug 61 (FIG. 3) which protects the lock from dirt and the weather. The plug may be traversed by an opening 61', in register with the slot 25' in the neck of tube 25 for receiving the wire element of a conventional seal S, if desired.

In the modified form of housing shown in FIG. 8 a portion of the lower flange on the front wall is removed as indicated at 62. The edge of the bottom wall is recessed slightly at 63, 63' and deeply at 64, in order to enable the housing to be applied to a bolted angle piece with a perpendicular motion to the plane of the drawing, as may be required where a plurality of meter boxes are located too close together for horizontal assembly of the housing with the bolted parts. When the housing is thus cut away it is particularly important to use the washer 53 in order to prevent loosening of the nut 51. It will be understood that only one wall of the housing has to be cut away, as shown; assuming this to be the bottom wall, the top wall of the same housing will be recessed only to fit around the flanged cover of the box, as shown in FIG. 6.

In the modification shown in FIGS. 9 and 10 the outer portion 55 of the angle piece 56 is provided with a hole 57 and the reinforcing ridge 58 on the front wall 59 of the housing has a tongue or tab 60 stamped from it and bent inward to interlock with the hole 57, thus further inhibiting relative movement of the housing and the angle piece.

FIGS. 11 and 12 illustrate possible modification of the yoke; in FIG. 11 the inner arm is eliminated to leave a bracket 65 traversed by a bore 66 corresponding functionally to the opening 28 in FIGS. 3 and 5, whereas in FIG. 12 the outer arm is eliminated, leaving a bracket 67 having a bore 68 which corresponds to the opening 29 in FIGS. 3 and 5. Each of the brackets 65 or 67 is welded to the outer wall of the housing, as in the case of the yoke previously described and the bracket 67 may include a right-angled extension like that on bracket 26 in FIGS. 3 and 5.

FIGS. 15 to 18 illustrate the adaptation of the present invention to a meter box having a rolled rim 70 such that the flange 71 of the cover is flush with the wall 72 of the box. The upper wall 73 of the lock housing has a straight edge 74 lying adjacent the aligned edges of the flange and box wall, while the lower wall 75 is cut away at 76 as in FIG. 8, to permit installation by a vertical downward movement, if necessary. The angle piece 77 may be the same as the piece 41 which provides abutments for the lock washer 78 on nut 79, as explained in connection with FIGS. 13 and 14. In a box of this type the inner plate 80 cannot extend to the box rim, like plate 40, so it is turned 90° to a position such that its edge 81 is parallel to the inwardly formed rim 70. The head 82 of a threaded stud is welded to the plate 80, and installation in the box wall 72 is aided by a tight fitting O-ring 84, as previously explained.

Except as just noted, the interior parts of this locking assembly are standardized and adaptable to either type of meter box. The housings may suitably be made up in right hand and left hand models for each box, so that the cut away wall can always face downward; this not only provides more complete protection from the elements but also makes tampering more difficult.

From the foregoing it will be seen that the angle piece, when bolted in place, makes it impossible to open the cover of the box without some act involving major damage or destruction, while the housing, when locked in place, prevents loosening of the nut on the bolt. The angle piece is of heavy steel strip and the housing is also of heavier material than the box and is welded on all corners so that bending is almost impossible and cutting very difficult. Thus any attack on the lock assembly will either be totally unsuccessful or will cause damage which is quite apparent to even a casual inspection.

While the guard lock shown in FIGS. 1 to 5 and described above is very strong and effective, experiments have shown that a powerful lifting force, introduced in any manner beneath the end of the lock guard 20, can rock the housing around a pivot in the vicinity of the yoke 26 and balls 32, with some deformation, sufficiently to permit access to the nut 51 on stud 42. Any such access raises the possibility that a special tool can be used to unscrew the nut, even by small increments, to make possible the opening of the meter box.

A simple means for defeating such vandalism is shown in FIGS. 19 to 21, wherein most of the elements are exactly as shown in FIGS. 1 to 5, while the angle piece 85, with outer portion 86, outer middle portion 87, inner middle portion 88 and locking portion 89 (corresponding to portions 46, 47, 48 and 49) is provided with an angular channel shaped reinforcement 90. This reinforcement 90 has a flat rectangular base 91 which is welded at 94 to the surface of the outer middle portion 87, and flat rectangular wings 92, 93 having outer square corners 92', 93'.

The wings 92, 93 are so proportioned that, when the housing is assembled in locking position (FIG. 1), the corners 92', 93' of the wings fit closely within the outer corner 95 of the housing. The effect of this close fit is to make impossible the tilting of the housing around any interior pivot point since the front wall 19 of the housing bears immediately against the corners 92', 93'.

It will thus be seen that the objects set forth above, among those made apparent from the preceding description, are efficiently attained, and, since certain changes may be made in the above article without departing from the spirit and scope of the invention, it is intended that all matter contained in the above description and shown in the accompanying drawings shall be interpreted as illustrative and not in a limiting sense.

What I claim is:

1. A locking assembly for a box having walls and being closed by a flanged cover comprising, an angle piece having a first portion adapted to overlie the cover and a second portion adapted to rest against a wall of the box adjacent the flange of the cover, a bolt passing through and projecting from the box wall and provided with a nut for securing said second portion to said wall with the first portion overlying the cover, a housing covering and enclosing on at least four sides the angle piece and said securing means, and a lock within the housing and holding the housing releasably in covering position, the angle piece having a third portion projecting from the second portion and the housing lock being engageable with said third portion, the angle piece being provided with at least one wing piece having a part which extends to a point close to the interior surface of the housing spaced a maximum distance from the angle piece.

2. A locking assembly according to claim 1 wherein the angle piece is provided with two wing pieces each having a part which extends to a point close to the interior surface of the housing spaced a maximum distance from the angle piece.

3. A locking assembly according to claim 2 wherein the housing is of generally rectangular box-like configuration and said points spaced from the angle piece are two adjacent interior corners of said box-like housing.

4. A locking assembly for a box having walls and being closed by a flanged cover wherein the cover flange overlies an edge of an adjacent wall of the box, comprising a Z-shaped angle piece having a first portion adapted to overlie the cover, a second portion adapted to lie adjacent the cover flange and adjacent box wall and a third portion projecting at a right angle from the second portion, releasable means mounted in said box wall adjacent the flange of the cover for securing said second portion to said wall with the first portion overlying the cover, a housing covering and enclosing on at least four sides the angle piece and said securing means and a lock within the housing and holding the housing releasably in covering position, said second portion of the angle piece being provided with an angular channel-shaped element comprising a flat base fixed on the angle piece and two wing pieces projecting from said base away from the angle piece, parts of the wing pieces extending to points close to the interior surface of the housing spaced a maximum distance from the angle piece.

5. A locking assembly according to claim 4 wherein the housing is of generally rectangular box-like configuration and said points spaced from the angle piece are two adjacent interior corners of said box-like housing.

* * * * *